United States Patent
Mashimo (10) Patent No.: US 7,304,924 B2
(45) Date of Patent: Dec. 4, 2007

(54) OPTICAL DISK DEVICE CAPABLE OF DEMODULATION AND VERIFICATION OF ADDRESS DATA FROM LAND AND GROOVE TRACK ADDRESS SYSTEMS

(75) Inventor: Akira Mashimo, Tokorozawa (JP)

(73) Assignee: TEAC Corporation, Musashino-shi (JP)

( * ) Notice: Subject to any disclaimer, the term of this patent is extended or adjusted under 35 U.S.C. 154(b) by 546 days.

(21) Appl. No.: 10/877,365

(22) Filed: Jun. 25, 2004

(65) Prior Publication Data

US 2004/0264324 A1    Dec. 30, 2004

(30) Foreign Application Priority Data

Jun. 27, 2003 (JP) ............................. 2003-185421
Sep. 26, 2003 (JP) ............................. 2003-336506

(51) Int. Cl.
*G11B 7/00* (2006.01)
(52) U.S. Cl. ............................ 369/47.22; 369/275.3; 369/275.4
(58) Field of Classification Search ............. 369/47.22, 369/275.3, 275.4
See application file for complete search history.

(56) References Cited

U.S. PATENT DOCUMENTS

| | | | |
|---|---|---|---|
| 6,122,233 A | 9/2000 | Iketani et al. | |
| 6,757,227 B2 * | 6/2004 | Kumagai et al. | 369/44.37 |
| 6,772,429 B2 | 8/2004 | Yoon | |
| 2001/0033532 A1 | 10/2001 | Asano | |
| 2001/0050888 A1 | 12/2001 | Eguchi | |
| 2003/0095481 A1 * | 5/2003 | Williams et al. | 369/47.28 |
| 2003/0117926 A1 | 6/2003 | Hori | |
| 2004/0264326 A1 | 12/2004 | Mashimo | |
| 2005/0122890 A1 | 6/2005 | Ando | |

FOREIGN PATENT DOCUMENTS

| | | |
|---|---|---|
| EP | 0986051 A1 | 3/2000 |
| EP | 1098301 A2 | 5/2001 |
| EP | 1150283 A2 | 10/2001 |
| JP | 10214438 | 8/1998 |
| JP | 10312541 | 11/1998 |

(Continued)

OTHER PUBLICATIONS

Notice of Allowance for U.S. Appl. No. 10/877,537, mailed Mar. 7, 2007.

(Continued)

*Primary Examiner*—Wayne Young
*Assistant Examiner*—LaTanya Bibbins
(74) *Attorney, Agent, or Firm*—Christensen O'Connor Johnson Kindness PLLC (57) ABSTRACT

A high-definition optical disk device for recording and reproducing data with respect to lands and grooves of an optical disk. The grooves and the lands of the optical disk are wobbled, and address information is embedded in gray code. In the grooves and the lands, both groove track address systems and land track address systems are embedded and form redundant systems. When detecting the address of a land, in addition to demodulation of the address data from the land track address system, the address data is also extracted from the groove track address system. The address data thus extracted is used for verification to detect an error in the demodulated address data.

12 Claims, 10 Drawing Sheets

FOREIGN PATENT DOCUMENTS

JP          11149644        6/1999

OTHER PUBLICATIONS

Notice of Grounds for Rejection of Japanese Patent Application Serial No. 2003-336504, mailed Jan. 4, 2005.

Notice of Grounds for Rejection in corresponding Japanese Patent Application Serial No. 2003-336506 mailed on Jan. 4, 2005.

European Patent Office Partial Search Report, dated Jul. 26, 2007, for application EP 04 25 3722, which corresponds to U.S. Patent No. 7,245,579 B2.

* cited by examiner

| | | Address 1 | Address 2 | |
|---|---|---|---|---|
| | | ⋮ | ⋮ | |
| | L3 | n+3 | NG | ... |
| | G3 | n+3 | n+2 | ... |
| | L2 | NG | n+2 | ... |
| | G2 | n+1 | n+2 | ... |
| | L1 | n+1 | NG | ... |
| | G1 | n+1 | n+1 | ... |
| | | ⋮ | ⋮ | |

OUTER RADIUS (PERIPHERY) SIDE ↑
INNER RADIUS (PERIPHERY) SIDE ↓

| ADDRESS | CODE SEQUENCE |
|---|---|
| 0 | 00000000 |
| 1 | 00000001 |
| 2 | 00000011 |
| 3 | 00000010 |
| 4 | 00000110 |
| 5 | 00000111 |
| 6 | 00000101 |
| 7 | 00000100 |
| 8 | 00001100 |
| 9 | 00001101 |
| 10 | 00001111 |
| 11 | 00001110 |
| 12 | 00001010 |
| 13 | 00001011 |
| 14 | 00001001 |
| 15 | 00001000 |
| 16 | 00011000 |
| ⋮ | ⋮ |
| 253 | 10000011 |
| 254 | 10000001 |
| 255 | 10000000 |

Fig. 13 PRIOR ART

OPTICAL DISK DEVICE CAPABLE OF DEMODULATION AND VERIFICATION OF ADDRESS DATA FROM LAND AND GROOVE TRACK ADDRESS SYSTEMS

BACKGROUND OF THE INVENTION

1. Field of the Invention

The present invention relates to an optical disk device, and more particularly to a high-definition optical disk device for using grooves and lands for the recording and reproduction of data.

2. Description of Related Art

Optical disks which achieve higher recording densities by recording data on both grooves and lands, rather than on grooves alone, are conventionally known. When data is recorded on both grooves and lands, it is necessary to detect the addresses correctly in both the grooves and the lands. In DVD-RAM systems, a method called CAPA (Complementary Allocated Pit Address) is used in which a particular signal is inserted for each sector irrespective of data recording with regard to time and the signal is reproduced to detect the address. More specifically, each sector includes, at the leading end thereof, an address region (a header portion) independent of a data region, and a plurality of CAPA signals are inserted in this header portion in such a manner that they are offset to left and right with respect to the grooves and lands in the data region. Thus, the address is detected in the grooves and lands using the fact that different CAPA signals are detected between data recording and reproduction with respect to the grooves and data recording and reproduction with respect to the lands.

The above method, however, has a problem in that, because the address region is provided irrespective of the data region with regard to time, the data capacity of an optical disk is decreased accordingly. In addition, the manufacture of such an optical disk is more complicated because the grooves and the CAPA signals are not aligned in a line. There are also problems that the servo systems or the parameter optimal points of servo or the like differ between the data portion and the header portion when recording or reproducing data.

To deal with the above problems, techniques in which wobbles used for storing the address of grooves are used to determine not only the groove address but also the land address have been proposed.

For example, Japanese Patent Laid-Open Publication No. Hei 10-312541 considers the fact that when address information is embedded by recording data 0 and data 1 for a groove which is wobbled in phase at 0 degree and for a groove which is wobbled in phase at 180 degree respectively, the land interposed between these grooves does not necessarily have in-phase wobbles and the address of the land cannot be determined even if these two adjacent grooves have in-phase wobbles, and provides a technique in which two addresses are provided and the address of the land is determined by either one of these addresses.

Figure 10:
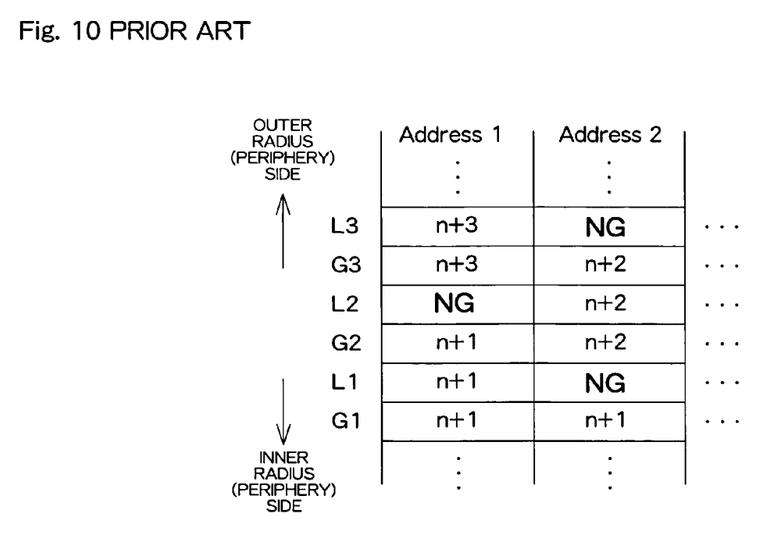
FIG. 10 is a diagram for explaining a conventional address format.

FIG. 10 shows the address format described in the above-noted publication.

Figure 11:
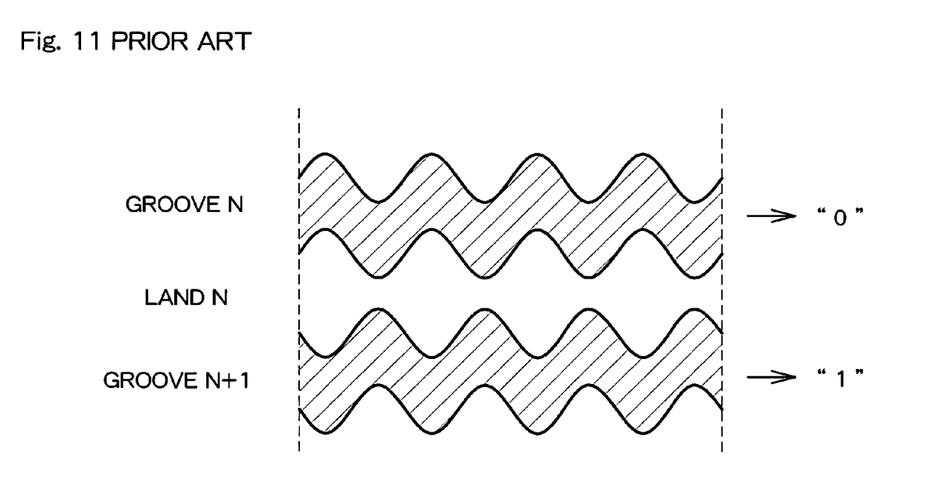
FIG. 11 is a diagram for explaining wobbles of grooves and lands.

The addresses include region addresses and track addresses (track numbers), and the region addresses are identical for the segments arranged in the same direction. FIG. 10 shows the track addresses only. G1, G2, G3, . . . represent grooves and L1, L2, L3, . . . represent lands. The track number is smaller toward the inner periphery of a disk and increases toward the outer periphery thereof. The track number in G1 is n+1, the track number in G2 is n+2, the track number in L1 is n+1, and the track number in L2 is n+2. Each groove is wobbled, as shown in FIG. 11, and "0" is recorded by in-phase wobbles of 0 degree and "1" is recorded by in-phase wobbles of 180 degree.

With regard to G1, L1, and G2, in a typical situation, because the track numbers are different for G1 and G2, the phase of wobbles formed in G1 and the phase of wobbles formed in G2 are reversed. Consequently, in L1 sandwiched between G1 and G2, the wobble of G1 and the wobble of G2 form phases of 180 degree with respect to each other, namely reverse phases, and the address cannot be detected. To address this problem, in Address 1, an identical track number is assigned to G1 and G2, so that L1 sandwiched between these grooves has in-phase wobbles which can determine the track number n+1. In Address 2, on the other hand, because the original track numbers n+1 and n+2 are assigned to G1 and G2, respectively, the address of L1 provided between these grooves cannot be detected and results in "NG".

Further, with regard to G2, L2, and G3, in a normal situation, because the track numbers are different for G2 and G3, the phase of wobbles formed in G2 and the phase of wobbles formed in G3 are reversed. Therefore, in L2 sandwiched between G2 and G3, the wobble of G2 and the wobble of G3 form phases of 180 degree with respect to each other, namely reverse phases, and the address cannot be detected. To address this problem, in Address 2, an identical track number is assigned to G2 and G3, so that L2 sandwiched between these grooves has in-phase wobbles which can determine the track number n+2. In this case, in Address 1, the address of L2 cannot be detected and results in "NG".

It should be noted that, for recording address data on a disk in the form of wobbles, binary data is converted into gray code for recording, gray code being a code wherein, for adjacent binary data, the distance between codes, namely the number of inverted bit, is 1.

Figure 12:
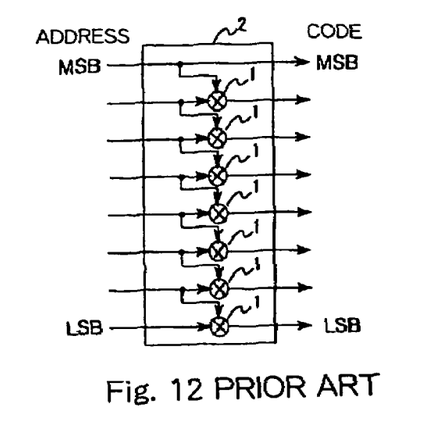
FIG. 12 is a diagram showing a structure of a gray code converter.
Figure 13:
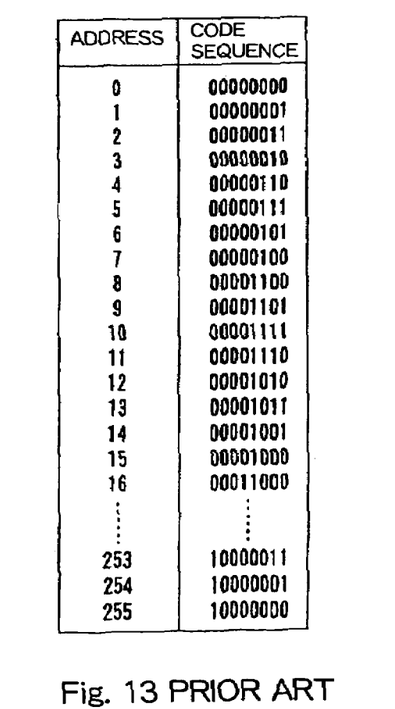
FIG. 13 is a diagram for explaining correspondence between address values and gray code.

FIG. 12 shows a gray code converter 2 for converting binary data to gray code, and FIG. 13 shows a relationship between addresses and gray code strings. The gray code converter 2 includes a plurality of EX-OR (Exclusive OR) gates 1. When an address is 8-bit data, the least significant bit LSB is exclusive ORed with the next higher bit to obtain the least significant bit LSB of gray code. In a similar manner, adjacent address bits are exclusive ORed to obtain gray code. The most significant bit MSB of the address is directly used in gray code. In the exclusive OR operation, two identical inputs result in an output 0 and two different inputs result in an output 1. Accordingly, the binary address data "00000000" is converted to gray code "00000000" for that address. The binary address data "00000001" is converted to gray code "00000001". The binary address data "00000010" is converted to gray code "00000011". As is obvious from FIG. 13, the distance between codes for two consecutive address values is always 1.

As described above, conventionally, the land address and the groove address are detected by providing two addresses, Address 1 and Address 2. However, the conventional method merely uses one of these addresses and does not make effective use of redundant addresses. In particular, because there is a possibility that the detected address is erroneous, it is necessary to verify the detected address in some way.

A parity check, for example, is used for error check of detected data. However, the parity check is not desirable because a parity bit must be added to original data and this causes the distance between codes in gray code to exceed 1.

SUMMARY OF THE INVENTION

The advantage of the present invention is to provide a device which, when recording/reproducing data with regard to an optical disk on which two addresses such as Address 1 and Address 2 are formed in each of lands and grooves as in the conventional art, can make effective use of these two addresses to verify a detected address, thereby achieving more reliable address detection.

In accordance with one aspect of the present invention, the present invention provides an optical disk device for recording or reproducing data with respect to grooves and lands of an optical disk in which address information is embedded by wobbling the grooves and the lands, the address information being embedded after conversion into gray code where the distance between codes for two consecutive address values equals 1, in which the address information of the lands includes two address systems, which are a land track address system defined by in-phase wobbles where the phase of the wobble on the inner periphery side and the phase of the wobble on the outer periphery side forming the lands are identical and a groove track address system defined by including reverse phase wobbles where the phase of the wobble on the inner periphery side and the phase of the wobble on the outer periphery side forming the lands are reversed, the optical disk device comprising means for demodulating a wobble signal obtained by reproducing the land track address system to obtain first land address information, means for extracting second land address information from the groove track address system, and means for detecting an error in the first land address information by determining whether or not the first land address information and the second land address information correspond to each other.

While the address can be determined by demodulating the land track address system defined by in-phase wobbles to obtain address information, there is a possibility that the demodulated address information includes an error. Accordingly, address information is also extracted from the groove track address system so as to verify the demodulated address information. The demodulated address information is judged to be correct when the both addresses correspond to each other. The demodulated address information can be judged to be erroneous when both do not correspond to each other. According to the present invention, it is possible to detect an error without adding a parity bit to gray code.

According to the present invention, when a groove n, a land n, a groove n+1, a land n+1, . . . are sequentially formed on an optical disk from the inner periphery toward the outer periphery, the means for extracting the second land address information may include means for calculating, from an address value in binary data which is determined from the first land address information, the next address value in binary data consecutive to the determined address value and detecting a bit position corresponding to the reverse phase wobble from the binary data address value which is determined and the next binary data address value obtained by calculation, and means for inversely converting gray code of the groove track address system into a binary address such that the binary value is 0 at the bit position. This structure makes use of the fact that the reverse phase bit position in consecutive gray code always corresponds to a carry bit position, namely a bit position where "0" is carried to "1", in the corresponding consecutive binary numbers.

In accordance with another aspect of the present invention, there is provided an optical disk device for recording or reproducing data with respect to grooves and lands of an optical disk in which address information is embedded by wobbling the grooves and the lands, the address information being embedded after conversion into gray code where the distance between codes for two consecutive address values equals 1, in which the address information of the grooves includes two address systems, which are a groove track address system defined by in-phase wobbles where the phase of the wobble on the inner periphery side and the phase of the wobble on the outer periphery side forming the grooves are identical and a land track address system defined by including reverse phase wobbles where the phase of the wobble on the inner periphery side and the phase of the wobble on the outer periphery side forming the grooves are reversed, the optical disk device comprising means for demodulating a wobble signal obtained by reproducing the groove track address system to obtain first groove address information, means for extracting second groove address information from the land track address system, and means for detecting an error in the first groove address information by determining whether or not the first groove address information and the second groove address information correspond to each other.

According to the present invention, while the address can be determined by demodulating the groove track address system defined by in-phase wobbles to obtain address information, there is a possibility that the demodulated address information includes an error. Accordingly, address information is also extracted from the land track address system so as to verify the demodulated address information. The demodulated address information is judged to be correct when the both addresses correspond to each other. The demodulated address information can be judged to be erroneous when both do not correspond to each other. According to the present invention, it is possible to detect an error without adding a parity bit to gray code.

In accordance with a further aspect of the invention, when a groove n, a land n, a groove n+1, a land n+1, . . . are sequentially formed on an optical disk from the inner periphery toward the outer periphery, the means for extracting second groove address information may include means for calculating, from an address value in binary data which is determined by the first groove address information, the previous address value in binary data consecutive to the determined address value and detecting a bit position corresponding to the reverse phase wobble from the determined binary data address value and the previous binary data address value obtained by calculation, and means for inversely converting gray code of the land track address system into a binary address such that the binary data is 1 at the bit position.

In accordance with a still further aspect of the invention, when a land n, a groove n, a land n+1, and a groove n+1, . . . are sequentially formed on an optical disk from the inner periphery toward the outer periphery, the means for extracting second land address information may include means for calculating, from an address value in binary data which is determined by the first land address information, the previous address value in binary data consecutive to the determined address value and detecting a bit position corresponding to the reverse phase wobble from the determined binary data address value and the previous binary data address value obtained by calculation, and-means for inversely converting gray code of the groove track address system into a binary address such that the binary data is 1 at the bit position.

In accordance with another aspect of the invention, when a land n, a groove n, a land n+1, a groove n+1, . . . are sequentially formed on an optical disk from the inner periphery toward the outer periphery, the means for extracting second groove address information may include means for calculating, from an address value in binary data which is determined by the first groove address information, the next address value in binary data consecutive to the determined address value and detecting a bit position corresponding to the reverse phase wobble from the determined binary data address value and the next binary data address value obtained by calculation, and means for inversely converting gray code of the land track address system into a binary address such that the binary data is 0 at the bit position.

The present invention will be understood more clearly by referring to the following detailed description of a preferred embodiment. It should be understood, however, that the scope of the present invention is not limited to the following embodiment.

BRIEF DESCRIPTION OF THE DRAWINGS

A preferred embodiment of the present invention will be described in detail based on the following drawing, wherein.

DETAILED DESCRIPTION OF PREFERRED EMBODIMENT

A preferred embodiment of the present invention will be described in further detail with reference to the accompanying drawings.

Figure 1:
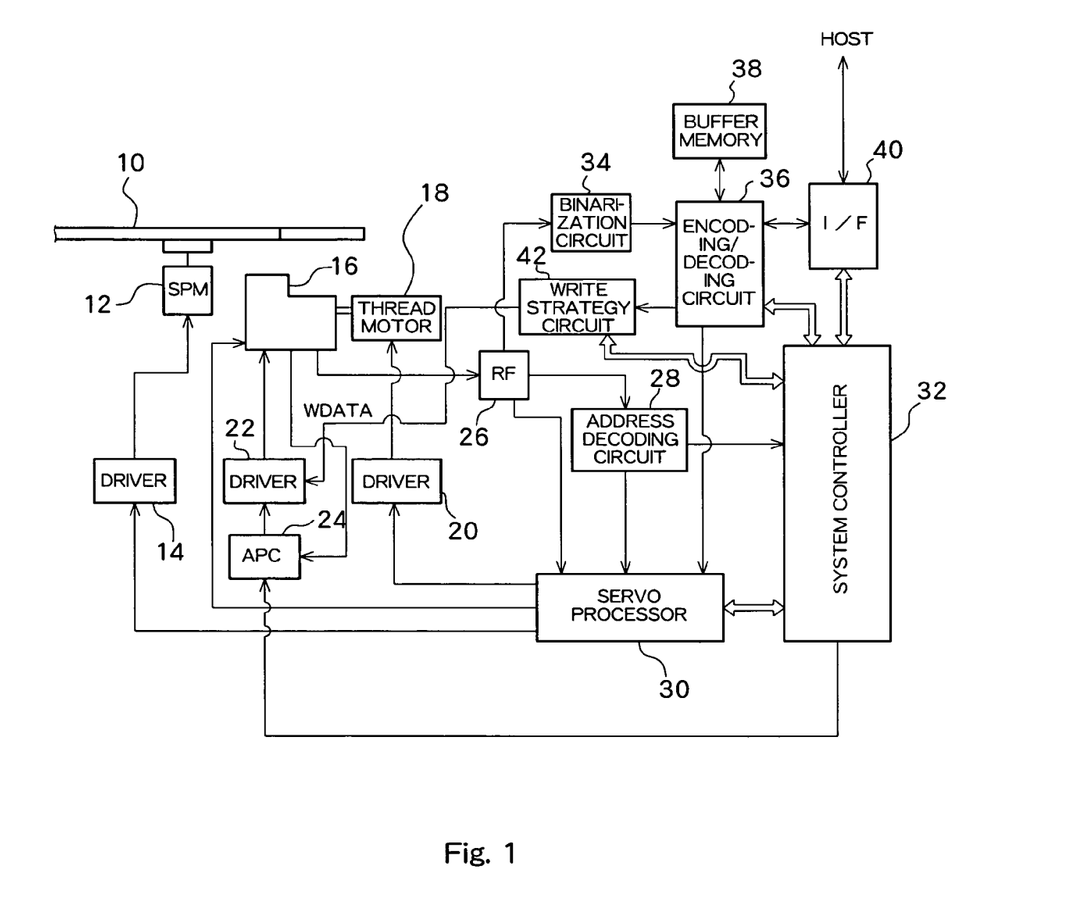
FIG. 1 is a diagram showing a whole structure of an optical disk device according to one embodiment of the present invention.

FIG. 1 shows the overall structure of an optical disk device according to the present embodiment. An optical disk 10 is driven to rotate by a spindle motor (SPM) 12. The spindle motor SPM 12 is driven by a driver 14, which, in turn, is servo-controlled by a servo processor 30 so as to operate at a desired rotation rate. In the present embodiment, as an example, the driver 14 drives the optical disk 10 in such a manner that the optical disk 10 is divided into a plurality of zones between the inner periphery and the outer periphery thereof and constant angular velocity is realized in each zone (ZCAV).

An optical pickup 16, which includes a laser diode (LD) for irradiating laser light onto the optical disk 10 and a photo detector (PD) for receiving and converting light reflected from the optical disk 10 into an electric signal, is disposed facing the optical disk 10. The optical pickup 16 is driven by a thread motor 18 in the radial direction of the optical disk 10. The thread motor 18 is driven by a driver 20, which is servo controlled by the servo processor 30 in the same manner as the driver 14. Further, the LD of the optical pick-up 16 is driven by the driver 22, which is controlled by an auto power control circuit (APC) 24 such that a drive current has a desired value. Specifically, the APC 24 controls the drive current of the driver 22 such that it becomes the optimum recording power selected by OPC (Optimum Power Control) which is performed in a test area (PCA) of the optical disk 10. The OPC is a process in which test data is recorded on the PCA of the optical disk 10 while changing the recording power stepwise, and then the test data is reproduced for evaluation of the signal quality, so that the recording power with which the desirable signal quality can be obtained is selected. For judgment of the signal quality, β values and γ values, values for the modulation factor, jitter, or the like are used.

When reproducing the data recorded on the optical disk 10, laser light of reproduction power is irradiated from the LD of the optical pickup 16, and the light reflected on the disk is converted into an electrical signal by the PD and output. A reproduction signal from the optical pickup 16 is supplied to an RF circuit 26, which generates a focus error signal and a tracking error signal from the reproduction signal and supplies these signals to the servo processor 30. The servo processor 30 servo controls the optical pickup 16 based on these error signals and retains the optical pickup 16 in the on-focus and on-track conditions.

The optical pickup 16 performs recording and reproduction with respect to grooves and lands of the optical disk 10. The grooves are formed helically on the optical disk 10. Date are recorded and reproduced with regard to grooves and lands alternately, such as groove 1→land 1→groove 2→land 2→groove 3→land 3→ . . . , for example. Alternatively, it is also possible that, for each zone, recording and reproduction be performed with respect to all the grooves within the zone, and that recording and reproduction then be performed with respect to all the lands within the same zone, such as, for each zone, recording and reproduction is performed with respect to the lands after recording and reproduction is performed with respect to the grooves. Further, the RF circuit 26 supplies an address signal (a wobble signal) contained in the reproduction signal to an address decode circuit 28. The address decode circuit 28 demodulates the address signal to obtain the address data of the optical disk 10, and supplies the demodulation data to the servo processor 30 and a system controller 32. The address data are embedded in the grooves and lands of the optical disk 10 in the form of wobbles. The optical disk 10 includes a region address and a track address as the address data. The address data are formed on the optical disk 10 in gray codes as shown in FIG. 13.

The address format of the optical disk 10 according to the present embodiment is formed by two address systems. One of the address systems is dedicated to detecting a groove track address (which system will therefore be referred to as "groove (G) track address system"), while the other address system detects a land track address (which system will therefore be referred to as "land (L) track address system"). Both the G track address systems and the L track address systems are formed in groove tracks. Similarly, both the G track address systems and the L track address systems are formed in land tracks. The addresses can be detected by the G track address systems of the groove tracks and by the L track address systems of the land tracks where wobbles are always adjusted in phase.

The RF circuit 26 supplies a reproduction RF signal to a binary circuit 34. The binary circuit 34 binarizes the reproduction signal to obtain an EFM signal (CD disk) or an 8-16 modulation signal (DVD disk), which is then supplied to an encode/decode circuit 36. The binary signal is then subjected to demodulation and error correction in the encode/decode circuit 36 to obtain reproduction data, which is output to a host device, such as a personal computer, via an interface I/F 40. Here, the encode/decode circuit 36 temporarily stores the reproduction data in a buffer memory 38 before outputting the reproduction data to the host device.

On the other hand, for recording data onto the optical disk 10, data to be recorded is supplied from the host device to the encode/decode circuit 36 via the interface I/F 40. The encode/decode circuit 36 stores the data to be recorded in the buffer memory 38, and then encodes and supplies the data to be recorded, as modulation data, to a write strategy circuit 42. The write strategy circuit 42 converts the modulation data into multi-pulses (a pulse train) in accordance with a predetermined recording strategy, and supplies the multi-pulses, as recording data, to the driver 22. The recording strategy is constituted by pulse widths of a leading pulse or subsequent pulses in multi-pulses and the pulse duty, for example. The recording strategy, which affects recording quality, is generally fixed to a certain optimum strategy, and may be set when performing the OPC. Then, laser light of a power modulated according to the recording data is irradiated from the LD of the optical pickup 16 onto the optical disk 10 for recording the data. After the data is recorded as described above, the optical pickup 16 irradiates laser light of reproducing power so as to reproduce the recorded data, and outputs the reproduced data to the RF circuit 26. The RF circuit 26 supplies the reproduction signal to the binary circuit 34 where the data is binarized and supplied to the encode/decode circuit 36. The encode/decode circuit 36 decodes the modulation data and compares the data with the recording data stored in the buffer memory 38. The result of comparison is supplied to the system controller 32, which determines, depending on the comparison result, whether to continue data recording or perform a changing process.

With the structure as described above, when detecting a land address so as to record or reproduce data with respect to lands, the land (L) track address systems formed in lands can be readily detected, but the groove (G) track address systems formed by including a reverse phase wobble cannot be detected (NG). According to the present embodiment, these G track address systems which result in NG are also used to detect the land address, so that an effective use can be made of the redundant addresses which have heretofore not been used. More specifically, the land address is detected from the G track address system which essentially results in NG, and the land address thus detected and the land address detected from the L track address system are compared for verifying the land address. This verification can be a substitute method for the parity check of land addresses. When both land addresses match, it is determined and confirmed that the land address detected from the L track address system is correct.

The land address detection from G track address systems in the land tracks, on which the above land address verification is based, will be described. It is assumed that on the optical disk 10, tracks are sequentially formed in such a manner as a groove n, a land n, a groove n+1, a land n+1, . . . , from the inner periphery toward the outer periphery.

With regard to the land tracks, while all the wobbles forming the L track address system are in-phase, the G track address system includes a reverse phase wobble and therefore provides an indefinite address. However, a land N, for example, originally has the same binary address as that of the groove N which is adjacent to the land N on the inner peripheral side. Accordingly, even when the address of the land N includes a reverse phase wobble in the least significant bit and is indefinite, the land address can be accurately determined by replacing the least significant bit of the binary address by "0". Similarly, a land N+1 originally has the same binary address as that of the groove N+1. Accordingly, even when the address of the land N+1 includes a reverse phase wobble in the bit next to the least significant bit (the first order bit) and is indefinite, the land address can be accurately determined by replacing that bit of the binary address by "0". In this manner, the land address can be obtained from the G track address systems by detecting the bit position where a reverse phase wobble is generated (a change bit position) in gray code of the G track address system in the land track and replacing the corresponding binary address at that bit position by 0.

Figure 2:
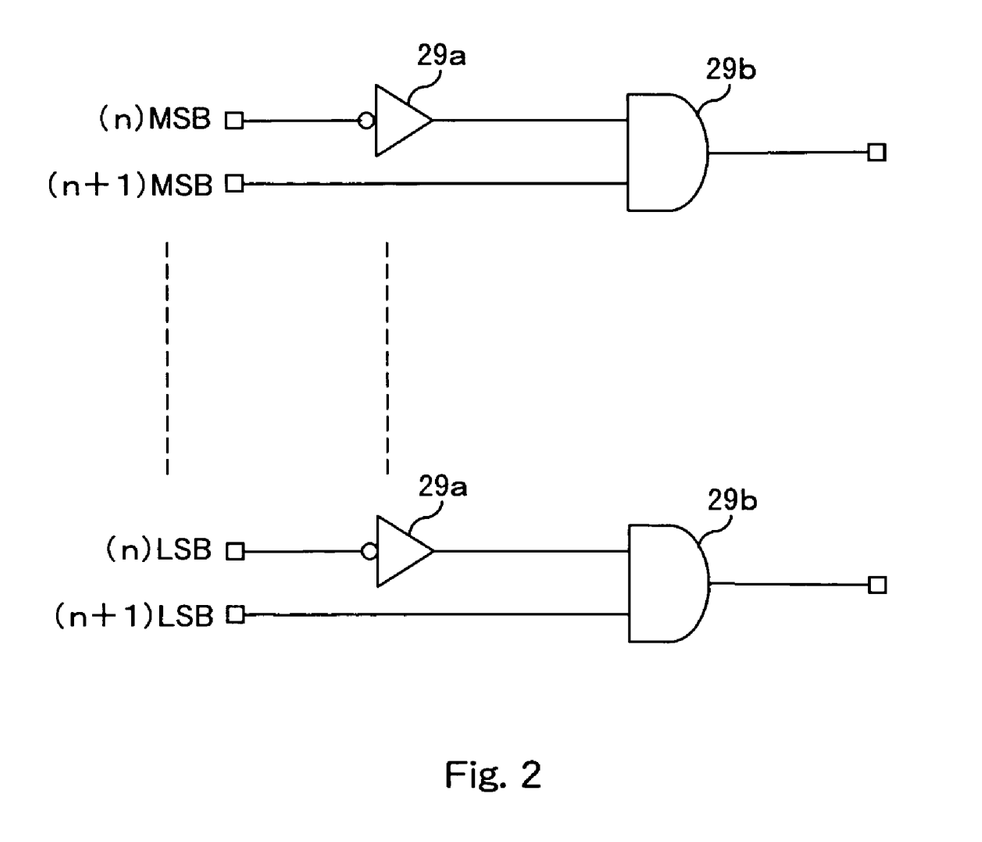
FIG. 2 is a circuit diagram showing a change bit position detection circuit of the embodiment.

FIG. 2 shows a change bit detection circuit for detecting a change bit position from gray code (including a reverse phase wobble) of the G track address system. The change bit position detection circuit is formed by a plurality of inverters 29*a* and a plurality of AND gates 29*b*. This circuit makes use of the fact that the change bit position in gray code always corresponds to a carry bit position in corresponding binary numbers, namely a bit position where "0" is carried to "1". More specifically, a binary address "000000" corresponds to gray code "000000", a binary address "000001" corresponds to gray code "000001", and a binary address "000010" corresponds to gray code "000011". When the binary address "000000" becomes the next binary address "000001", "0" becomes "1" in the least significant bit. In the corresponding gray code, on the other hand, "0" also becomes "1" similarly in the least significant bit. Thus, the change bit position is the least significant bit, which corresponds to the least significant bit in the binary address.

Further, when the binary address "000001" becomes the next binary address "000010", "0" becomes "1" in the bit (the first order bit) next to the least significant bit. In the corresponding gray code, on the other hand, "0" becomes "1" similarly in the first order bit. Thus, the change bit position is the first order bit, which corresponds to the first order bit in the binary address. Also, when the binary address "000010" becomes the next binary address "000011", "0" becomes "1" in the least significant bit. In the corresponding gray code, "1" becomes "0" similarly in the least significant bit.

For the subsequent bits, the change bit position in the gray code similarly corresponds to a carry bit position changing from "0" to "1" in the corresponding binary address. It is therefore possible to make use of this fact and detect a change bit position in gray code by detecting the carry position of the binary address. More specifically, when a binary address (N) is determined from the L track address system, the next binary address (n+1) is obtained by calculation and then a carry bit position is detected with regard to the n-th binary address and the (n+1)-th binary address, whereby the detected bit position can be used as a change bit position in the corresponding gray code. Here, the (n+1)-th binary address can be obtained from the n-th binary address simply by adding 1 to the n-th binary address. Further, the carry position with regard to the n-th binary address and the (n+1)-th binary address can be obtained by a logic circuit composed of an inverter and an AND gate.

Referring to FIG. 2, each bit (LSB to MSB) of the binary address (n) determined by the L track address system which is formed by only in-phase wobbles, from which the land address is to be detected, is supplied to the inverter 29a. Each bit is inverted in the inverter 29a and supplied to the AND gate 29b. On the other hand, each bit (LSB to MSB) of the next binary address which is obtained by adding 1 to the determined binary address is also supplied to the AND gate 29b, where AND operation of corresponding input bits is operated and output. The output of the AND gate 29b becomes "1" only when an input bit of the binary address is "0" and an input bit of the next binary address is "1". Accordingly, the bit position at which the output of the AND gate 29b is "1" is used to specify a change bit position of the corresponding gray code of the G track address system of interest. Namely, when two types of address systems, the G track address systems and the L track address systems, are sequentially formed, in this order, on a land track, the address is indefinite in the G track address system which comes first whereas the address information is determined in the next L track address system. Accordingly, the determined address information is used to calculate a change bit position in gray code of the G track address.

Figure 3:
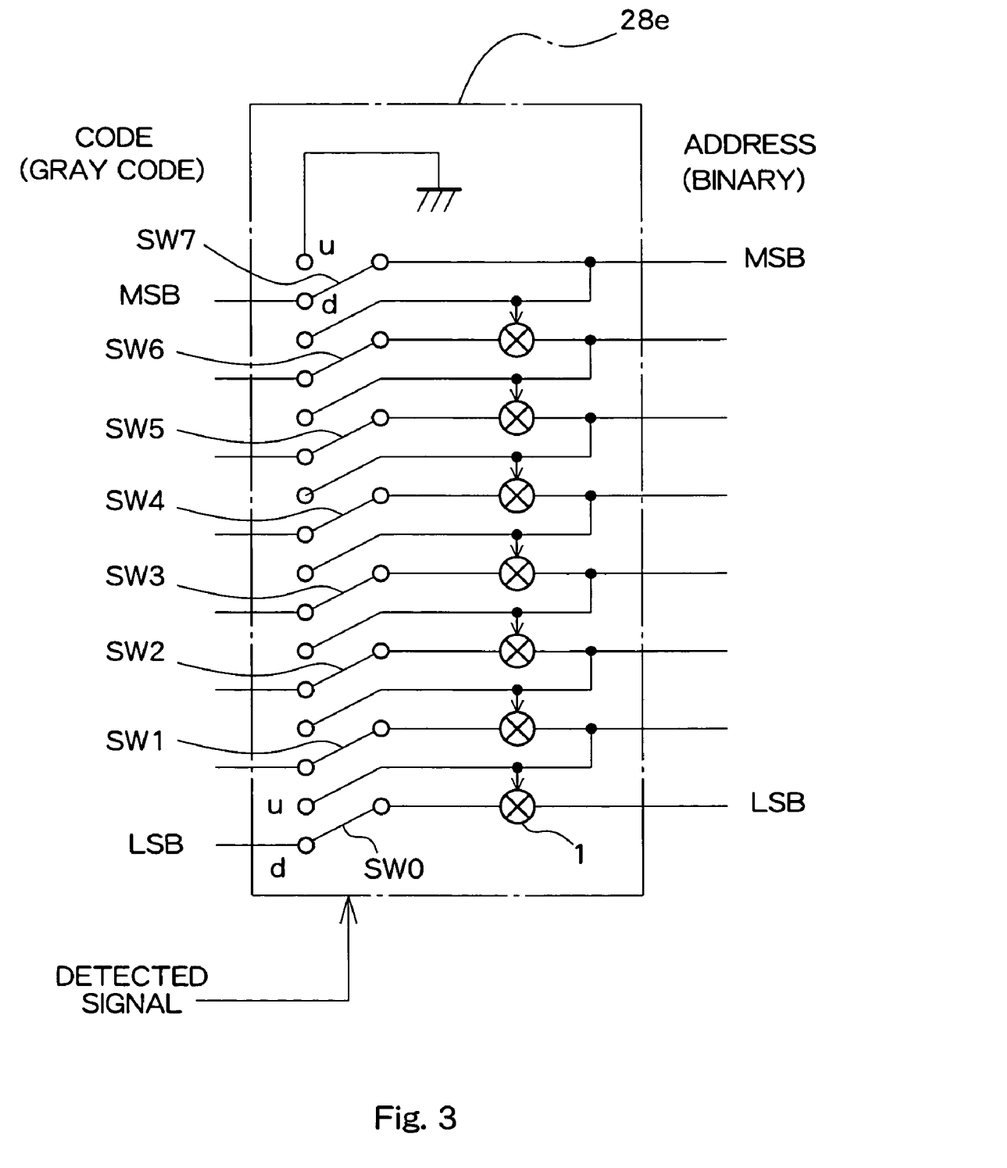
FIG. 3 is a diagram showing a structure of a gray code reverse converter.
Figure 4:
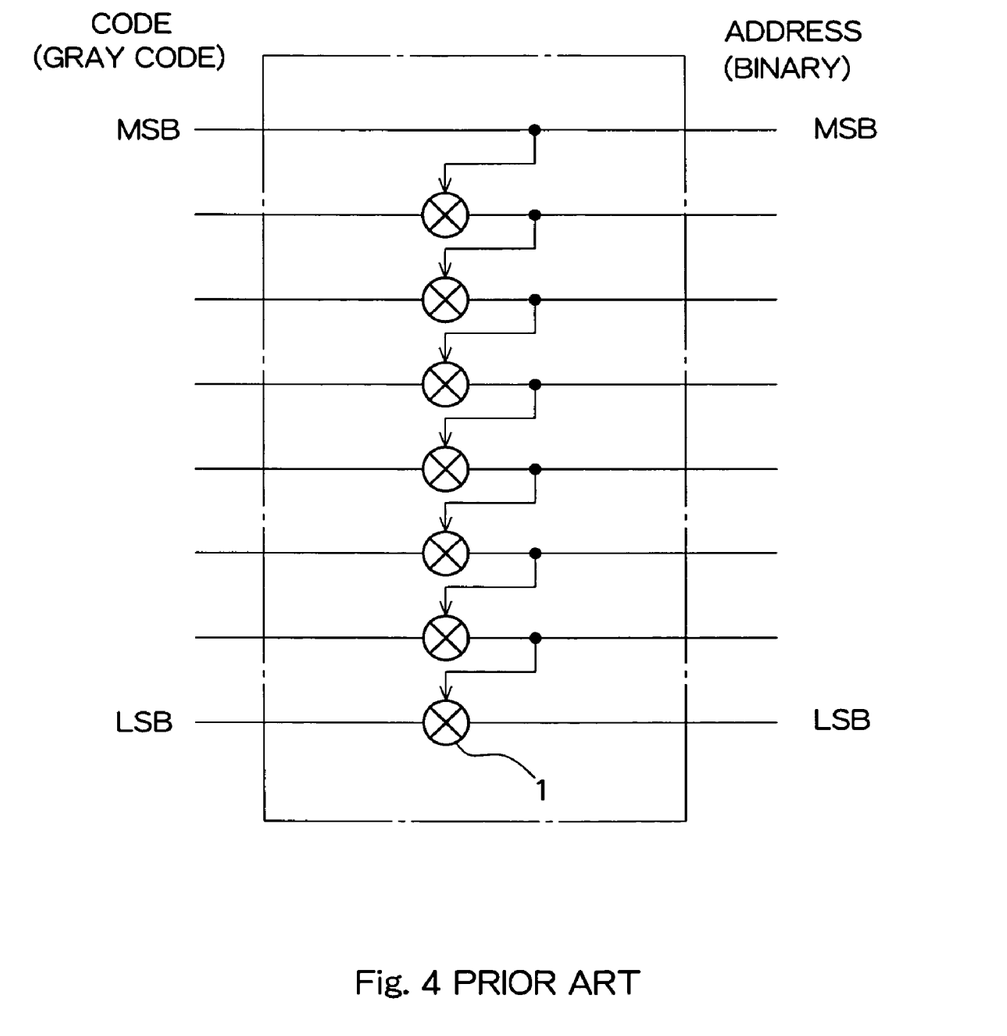
FIG. 4 is a diagram showing a structure of a conventional gray code reverse converter.

Next, detection of a binary address from corresponding gray code after detection of a change bit, namely inverse conversion from gray code to a binary address, will be described. The inverse conversion is carried out by bit replacement at the change bit position. FIG. 3 shows a circuit structure of a gray code reverse converter 28e included in the address decode circuit 28. The gray code reverse converter 28e is used for demodulating gray code to obtain the original binary data. A gray code converter performs Exclusive OR between adjacent bits, and a gray code reverse converter performs a basically inverse conversion thereof. FIG. 4 shows a structure of a conventional gray code reverse converter corresponding to a gray code converter of FIG. 12. The most significant bit MSB of gray code is output as is, and the lower bit next to the MSB is exclusive ORed with the MSB in the EX-OR gate 1 for inverse conversion. With regard to a certain bit of gray code, in the same manner, the certain bit is exclusive ORed with the next higher binary bit to convert the certain bit into binary data. The gray code reverse converter 28e of the present embodiment in FIG. 3, on the other hand, has a structure in which a switch SW is further provided corresponding to each bit in addition to the structure of the gray code reverse converter of FIG. 4.

Specifically, the most significant bit MSB of gray code is connected to a contact d of a switch SW7, while the other contact u of SW7 is grounded (corresponding to 0). Further, the least significant bit LSB of gray code is connected to a contact d of a switch SW0, while the other contact u is connected to the next higher binary bit. The remaining switches SW1 through SW6 are configured in the same manner as the switch SW0. Each of the switches SW0 to SW7 is switched to the contact d in a normal situation, and operates in the same manner as the gray code reverse converter shown in FIG. 4. When a change bit is detected, however, the switch SW corresponding to the change bit position is switched from the contact d to the contact u. For example, when a change bit is detected at the position of the least significant bit LSB of gray code, the switch SW0 is switched from the contact d to the contact u in accordance with the detection signal. Further, when a change bit is detected at the second position from the bottom, the SW1 is switched from the contact d to the contact u in accordance with the detection signal. In a similar manner, for a switch SW corresponding to the position of a change bit, contacts are switched from d to u.

Figure 5:
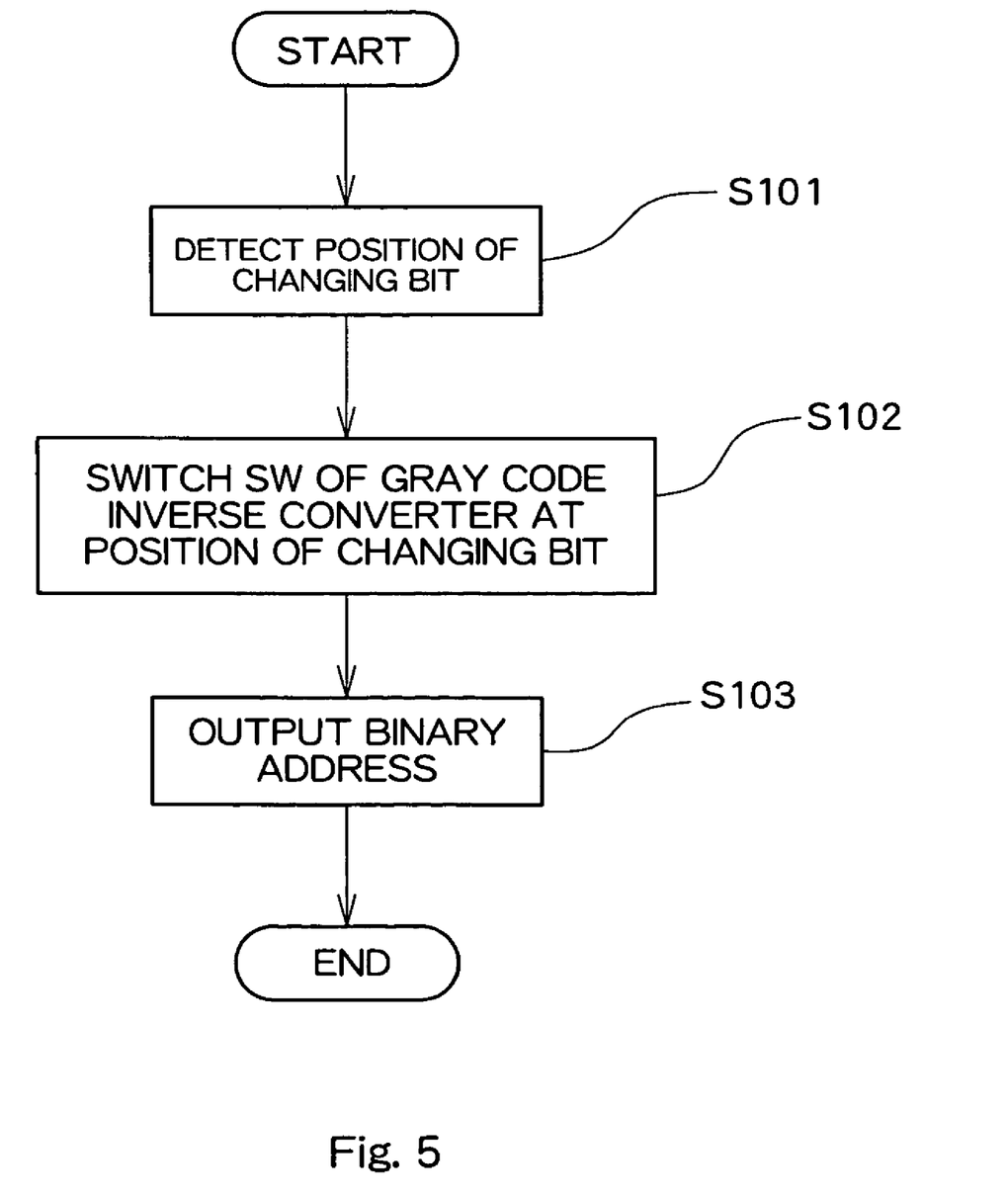
FIG. 5 is a flowchart of an address extraction process of the embodiment.

FIG. 5 shows a flowchart of a land address detection process according to the present embodiment. First, a change bit position in gray code is detected by the change bit detection circuit shown in FIG. 2 (S101). More specifically, from a binary address determined by the L address track system, the next binary address is calculated, and inversion and AND operation is performed for these binary addresses to thereby detect a bit position where "0" is carried to "1". The detection signal of the change bit position is supplied to the gray code reverse converter 28e of the address decode circuit 28. After detection of the change bit, contacts of the SW corresponding to the change bit position in the gray code reverse converter are switched (S102). Such a contact switching operation corresponds to a process in which the change bit of the G track address system is replaced by "0" so as to match the address with the adjacent groove track address on the inner peripheral side. Then, the resultant binary address is output and supplied to the system controller 32.

The advantage of switching SW of the gray code reverse converter 28e will be described in further detail.

Figure 6:
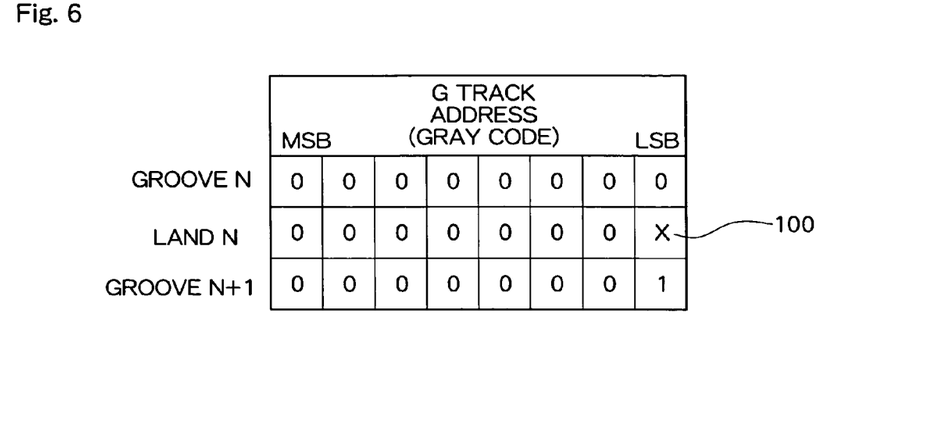
FIG. 6 is a diagram for explaining gray code in the land N.

FIG. 6 shows gray codes of G track address systems in the grooves N and N+1. The G track addresses are "00000000" for the groove N and "00000001" for the groove N+1. The change bit 100 in the land N is located at the position of the least significant bit.

Figure 7:
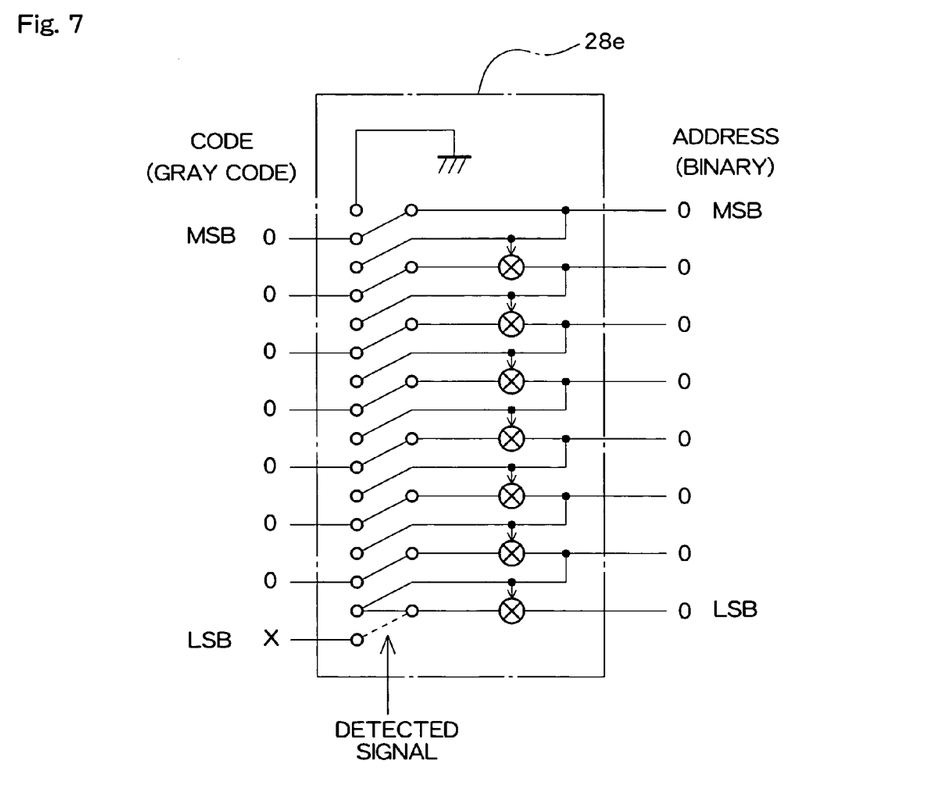
FIG. 7 is a diagram for explaining an operation of the gray code reverse converter.

FIG. 7 shows a structure of the gray code reverse converter 28e when the contact d is switched to the contact u in the switch SW0 corresponding to the least significant bit. In gray code of the land N, the most significant bit MSB through the first order bit are all 0, while the least significant bit is indefinite "X". With regard to the most significant bit through the first order bit, conversion is performed in accordance with the normal gray code inverse conversion. For example, the most significant bit "0" directly corresponds to the most significant bit "0" in the binary address. Further, the sixth order bit "0" of gray code is exclusive ORed with the most significant bit "0" of the binary address to obtain the sixth order bit "0" of the binary address. Then, the fifth order bit "0" of gray code and the sixth order bit "0" of the binary address are exclusive ORed to obtain the fifth order bit "0" of the binary address. Also, the fourth order bit "0" of the gray code is exclusive ORed with the fifth order bit "0" of the binary address to obtain the fourth order bit "0" of the binary address. Further, the third order bit "0" of the gray code and the fourth order bit "0" of the binary address are exclusive ORed to obtain the third order bit "0" of the binary address. Also, the second order bit "0" of the gray code and the third order bit "0" of the binary address are exclusive ORed to obtain the second order bit "0" of the binary address. In addition, the first order bit "0" of the gray code and the second order bit "0" of the binary address are exclusive ORed to obtain the first order bit "0" of the binary address. With regard to the least significant bit LSB "X" of the gray code, however, because the contacts of the SW0 are switched from d to u, the first order bit "0" of the binary address is exclusive ORed with the first bit "0" of the binary address to obtain the least significant bit LSB "0" of the binary address. The resultant binary address obtained by inverse conversion of the gray code of the land N would be "00000000", which corresponds to the track address of the adjacent previous groove or the adjacent groove on the inner peripheral side, and is therefore determined to be a correct track address.

As described above, in the land tracks, the land address can be obtained from the G track address systems. On the other hand, the land address can also be obtained by demodulating a wobble signal from the L track address systems formed together with the G track address systems. Accordingly, the controller 32 receives these two land addresses as inputs, and determines whether or not the two addresses match.

Figure 8:
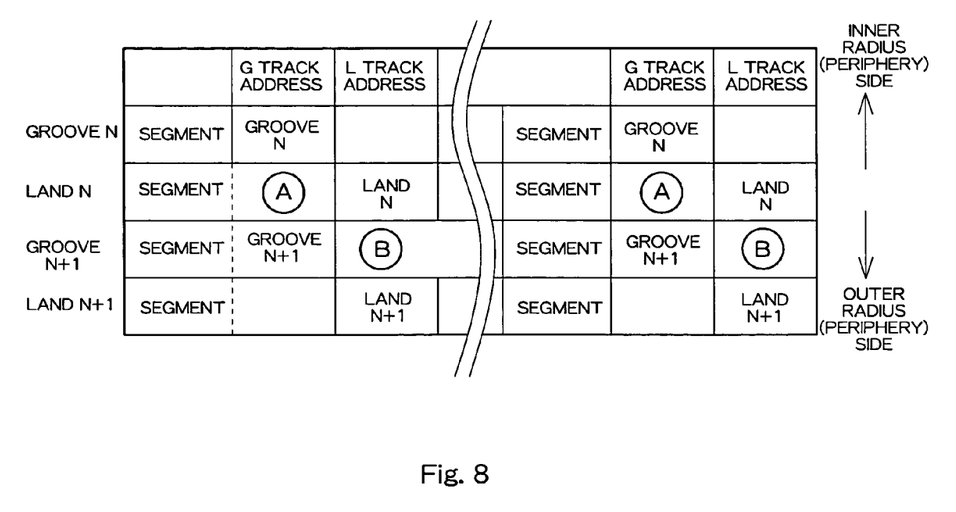
FIG. 8 is a view for explaining the G track address system and the L track address system of the embodiment.

FIG. 8 schematically shows the G track address systems and the L track address systems according to the present embodiment. The groove N, the land N, the groove N+1, and the land N+1 are shown, and each track includes the G track address systems and the L track address systems formed therein. In the drawing, of the address information, the region address is shown as "segment" (which means segment information).

With regard to the land N, although the G track address system includes a reverse phase wobble and is indefinite (indicated by A in the drawing), it is possible to calculate the land address by detecting a change bit position and replacing the binary address at the change bit position with "0". With regard to the L track address system following the G track address system, which is formed by in-phase wobbles, on the other hand, it is possible to detect the land address by demodulating the wobble signal. The system controller 32 receives and compares these two land addresses, and determines that the land address detected from the L track address system includes no error and can therefore can be recognized as a correct address when these addresses correspond to each other. When these addresses do not match, on the other hand, the system controller 32 determines that the land address detected from the L track address system includes an error. Although it is also possible to add a parity bit in gray code to thereby detect an error by the parity check, the added parity bit would increase the distance between codes in gray code. According to the present embodiment, both the G track address system and the L track address system are used, and more specifically, the binary address is calculated from the address system which includes a reverse phase wobble and is therefore originally indefinite, and is used for verification of the detected address, so that error detection and also error correction, which is substantially similar to parity checking, can be performed.

While detection of the land address in the land track has been described in the above example, a similar process can be performed in the grooves. Specifically, the groove tracks similarly include the G track address systems and the L track address systems formed therein. In the G track address systems formed by in-phase wobbles, it is possible to detect the groove address from a wobble signal. Although the L track address system includes a reverse phase wobble and is originally indefinite (indicated by B in FIG. 8), it is possible to calculate the groove address by detecting a change bit position and replacing the binary address at the change bit position with "1". Here, for the groove tracks, because the track adjacent to a certain groove on the inner peripheral side has a consecutive track number which is smaller than that of the certain groove by one (for example, when tracks are formed such as the land n−1, the groove n, and land n, of the tracks adjacent to the groove n, the land n−1 has the track number consecutive to n), from the binary address determined by the G track address system, the binary address which is smaller by one (the previous binary address) is obtained by calculation, and a change bit position of the L track address system which is indefinite is detected from these two binary addresses. Each bit of the previous ((n−1)-th) binary address obtained by calculation is supplied to the inverter 29a, which supplies the inverted outputs to the AND gate 29b. Further, each bit of the n-th binary address determined by the G track address system is also supplied to the AND gate 29b as it is. The AND gate 29b then performs and outputs AND operation of both input bit values. Here, the output of the AND gate 29b is "1" only when a bit of a binary address is "0" and a bit of the next binary address is "1". It is therefore possible to specify the bit position at which the output of the AND gate 29b is "1" as the change bit position of gray code of the L track address system of interest. The addresses of the G track address system and the L track address system thus detected are then supplied to the system controller 32, which can compare these addresses and determine whether or not the groove address detected from the G track address system includes an error based on the comparison result. It should be noted that, when calculating the groove address from the L track address system in the groove tracks, the binary address is replaced by "1" at the change bit position so as to make the groove address correspond to the address of the adjacent land track on the outer peripheral side.

Figure 9:
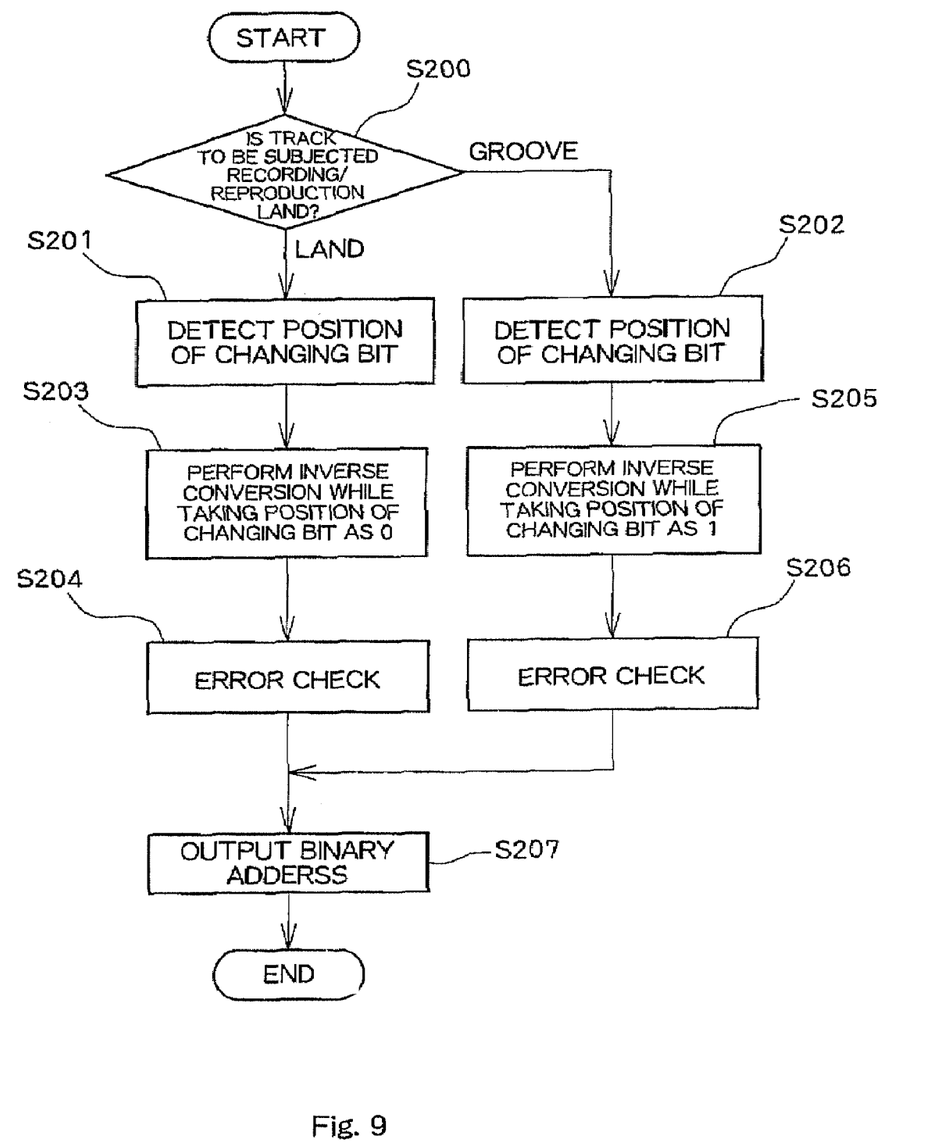
FIG. 9 is a flowchart of an error detection process of the embodiment.

FIG. 9 shows a flowchart of an error detection process as described above. First, it is determined whether or not the track for which the address is to be determined is a land (S200). If the track is determined to be a land, a change bit position in gray code of interest, namely in the G track address system is detected from the binary address determined by the L track address system and the next binary address obtained by calculation (S201). After detection of the change bit position, the gray code is reversely converted into a binary address such that the change bit position corresponds to "0" (S203). Subsequently, the obtained binary address is compared with the address determined by the L track address system to verify whether or not the land address detected from the L track address system has an error (S204).

On the other hand, if the track for which recording and reproduction is to be performed is determined to be a groove, a change bit position is detected from the binary address determined by the G track address system and the previous binary address obtained by calculation (S202), and the gray code is reversely converted into a binary address such that the change bit position corresponds to "1" (S205). The bit position may be replaced with "1" in such a manner that a NOT gate is added on the side of contact u in the gray code reverse converter 28e shown in FIG. 3 and the NOT gate is invalidated for recording/reproducing with respect to lands and is validated for recording/reproducing with respect to grooves, for example. The binary address is always "1" at the change bit position, because it is obtained by Exclusive Oring the binary address of the next order and an inverted value thereof. The binary address thus obtained is then compared to the groove address detected from the G track address system to verify whether or not the groove address detected from the G track address system includes an error based on the comparison result (S206).

If no error is found in the error check described above, the binary address is confirmed and output (S207).

As described above, according to the present embodiment, two types of address systems, the G track address systems and the L track address systems, are formed, and when recording/reproducing is performed with respect to groove tracks, an address is extracted from the L track address system and is used for verification of the groove address detected from the G track address system, and when recording/reproducing is performed with respect to land tracks, an address is extracted from the G track address system and is used for verification of the land address detected from the L track address system. Accordingly, it is possible to detect an error in the address without adding a parity bit, thereby increasing address reliability.

While the groove n, the land n, the groove n+1, the land n+1, ... are sequentially formed on the optical disk 10 from the inner to outer peripheries in the above example, the present invention is similarly applicable to the case where the land n, the groove n, the land n+1, the groove n+1, ... are sequentially formed on the optical disk 10 from the inner to outer peripheries.

In this case, in the land tracks, a binary address is determined from the L track address system, and the previous binary address is also calculated. Then, a change bit position in the G track address system is detected from the (n−1)-th binary address obtained by calculation and the determined n-th binary address. Specifically, each bit of the (n−1)-th binary address is supplied to the inverter 29a before being supplied to the AND gate 29b, while each bit of the n-th binary address is directly supplied to the AND gate 29b, and a bit position at which the output of the AND gate 29b is 1 is detected. In the groove tracks, on the other hand, a binary address is determined from the G track address system, and the next binary address is also calculated. Then, a change bit position in the L track address system is detected from the determined n-th binary address and the (n+1)-th binary address obtained by calculation. Specifically, each bit of the n-th binary address is supplied to the inverter 29a before being supplied to the AND gate 29b, while each bit of the (n+1)-th binary address obtained by calculation is directly supplied to the AND gate 29b, and a bit position at which the output of the AND gate 29b is 1 is detected.

While the preferred embodiment of the present invention has been described using specific terms, such description is for illustrative purposes only, and it is to be understood that changes and variations may be made without departing from the spirit or scope of the appended claims.

What is claimed is:

1. An optical disk device for recording or reproducing data with respect to grooves and lands of an optical disk in which address information is embedded by wobbling the grooves and the lands, the address information being embedded after conversion into gray code where the distance between codes for two consecutive address values is equal to 1, in which
the address information of the lands includes two address systems, which are a land track address system defined by in-phase wobbles where the phase of the wobble on the inner periphery side and the phase of the wobble on the outer periphery side forming the lands are identical and a groove track address system defined by including reverse phase wobbles where the phase of the wobble on the inner periphery side and the phase of the wobble on the outer periphery side forming the lands are reversed,
the optical disk device comprising:
means for demodulating a wobble signal obtained by reproducing the land track address system to obtain first land address information;
means for extracting second land address information from the groove track address system; and
means for detecting an error in the first land address information by determining whether or not the first land address information and the second land address information correspond to each other.

2. An optical disk device according to claim 1, wherein the means for extracting second land address information includes:
means for calculating, from an address value in binary data which is determined by the first land address information, the next address value in binary data consecutive to the determined address value and detecting a bit position corresponding to the reverse phase wobble from the determined binary data address value and the next binary data address value obtained by calculation; and
means for inversely converting gray code of the groove track address system into a binary address such that the binary data is 0 at the bit position.

3. An optical disk device according to claim 2,
wherein the means for detecting a bit position includes:
an inverter to which a bit of the determined binary address is input; and
a gate circuit to which an inverted output from the inverter and a bit at the corresponding position of the next binary address which is obtained by calculation are input, the gate circuit performing AND operation of these inputs; and
wherein the means for detecting a bit position detects, as the bit position, a position for which the output of the gate circuit is 1.

4. An optical disk device according to claim 1,
wherein the means for extracting second land address information includes:
means for calculating, from an address value in binary data which is determined by the first land address information, the previous address value in binary data consecutive to the determined address value and detecting a bit position corresponding to the reverse phase wobble from the determined binary data address value and the previous binary data address value obtained by calculation; and
means for inversely converting gray code of the groove track address system into a binary address such that the binary data is 1 at the bit position.

5. An optical disk device according to claim 4,
wherein the means for detecting a bit position includes:
an inverter to which a bit of the previous binary address obtained by calculation is input; and
a gate circuit to which an inverted output from the inverter and a bit at the corresponding position of the determined binary address are input, the gate circuit performing AND operation of these inputs; and
wherein the means for detecting a bit position detects, as the bit position, a position for which the output of the gate circuit is 1.

6. An optical disk device for recording or reproducing data with respect to grooves and lands of an optical disk in which address information is embedded by wobbling the grooves and the lands, the address information being embedded after conversion into gray code where the distance between codes for two consecutive address values is equal to 1, in which
the address information of the grooves includes two address systems, which are a groove track address system defined by in-phase wobbles where the phase of the wobble on the inner periphery side and the phase of the wobble on the outer periphery side forming the grooves are identical and a land track address system defined by including reverse phase wobbles where the phase of the wobble on the inner periphery side and the phase of the wobble on the outer periphery side forming the grooves are reversed, the optical disk device comprising:

means for demodulating a wobble signal obtained by reproducing the groove track address system to obtain first groove address information;

means for extracting second groove address information from the land track address system; and means for detecting an error in the first groove address information by determining whether or not the first groove address information and the second groove address information correspond to each other.

7. An optical disk device according to claim 6, wherein the means for extracting second groove address information includes:

means for calculating, from an address value in binary data which is determined by the first groove address information, the previous address value in binary data consecutive to the determined address value and detecting a bit position corresponding to the reverse phase wobble from the determined binary data address value and the previous binary data address value obtained by calculation; and means for inversely converting gray code of the land track address system into a binary address such that the binary data is 1 at the bit position.

8. An optical disk device according to claim 7, wherein the means for detecting a bit position includes:

an inverter to which a bit of the previous binary address which is obtained by calculation is input; and a gate circuit to which an inverted output from the inverter and a bit at the corresponding position of the determined binary address are input, the gate circuit performing AND operation of these inputs; and wherein the means for detecting a bit position detects, as the bit position, a position for which the output of the gate circuit is 1.

9. An optical disk device according to claim 6, wherein the means for extracting second groove address information includes:

means for calculating, from an address value in binary data which is determined by the first groove address information, the next address value in binary data consecutive to the determined address value and detecting a bit position corresponding to the reverse phase wobble from the determined binary data address value and the next binary data address value obtained by calculation; and means for inversely converting gray code of the land track address system into a binary address such that the binary data is 0 at the bit position.

10. An optical disk device according to claim 9, wherein the means for detecting a bit position includes:

an inverter to which a bit of the determined binary address is input; and a gate circuit to which an inverted output from the inverter and a bit at the corresponding position of the next binary address which is obtained by calculation are input, the gate circuit performing AND operation of these inputs; and wherein the means for detecting a bit position detects, as the bit position, a position for which the output of the gate circuit is 1.

11. An optical disk device for recording or reproducing data with respect to grooves and lands of an optical disk in which address information is embedded by wobbling the grooves and the lands, the address information being embedded after conversion into gray code where the distance between codes for two consecutive address values equals to 1, in which the address information of the lands includes two address systems, which are a land track address system defined by in-phase wobbles where the phase of the wobble on the inner periphery side and the phase of the wobble on the outer periphery side forming the lands are identical and a groove track address system defined by including reverse phase wobbles where the phase of the wobble on the inner periphery side and the phase of the wobble on the outer periphery side forming the lands are reversed, the optical disk device comprising:

an optical pickup for irradiating laser light to the land track address system and the groove track address system and converting reflected light into an electrical signal, which is then output as a reproduction signal;

an address decoder for demodulating a wobble signal contained in the reproduction signal of the land track address system to obtain first land address information and for extracting second land address information from a wobble signal contained in the reproduction signal of the groove track address system; and a controller for determining whether or not the first land address information and the second land address information match and determining that the first land address information is erroneous when the first land address information and the second land address information do not match.

12. An optical disk device for recording or reproducing data with respect to grooves and lands of an optical disk in which address information is embedded by wobbling the grooves and the lands, the address information being embedded after conversion into gray code where the distance between codes for two consecutive address values is equal to 1, in which the address information of the grooves includes a groove track address system defined by in-phase wobbles where the phase of the wobble on the inner periphery side and the phase of the wobble on the outer periphery side forming the grooves are identical and a land track address system defined by including reverse phase wobbles where the phase of the wobble on the inner periphery side and the phase of the wobble on the outer periphery side forming the grooves are reversed, the optical disk device comprising:

an optical pickup for irradiating laser light to the groove track address system and the land track address system and converting reflected light into an electrical signal, which is then output as a reproduction signal;

an address decoder for demodulating a wobble signal contained in the reproduction signal of the groove track address systems to obtain first groove address information and for extracting second groove address information from a wobble signal contained in the reproduction signal of the land track address systems; and a controller for determining whether or not the first groove address information and the second groove address information match and determining that the first groove address information is erroneous when the first groove address information and the second groove address information do not match.

* * * * *